United States Patent Office.

FRANK N. HOPKINS, OF BALTIMORE, MARYLAND.

Letters Patent No. 97,088, dated November 23, 1869.

IMPROVED CONGLOMERATE FOR PAVING, ROOFING, AND SIMILAR PURPOSES.

The Schedule referred to in these Letters Patent and making part of the same.

To all whom it may concern:

Be it known that I, FRANK N. HOPKINS, of the city and county of Baltimore, and State of Maryland, have invented a new and useful Conglomerate, Designed to be Used for Paving, Roofing, and like Purposes; and I do hereby declare that the following is a full, clear, and exact description of the same.

My invention consists in combining with pine-tar the substance known as Ritchie mineral, sometimes termed crystallized petroleum, and also Grahamite, and also combining with the pine-tar the substance known as Albertite, the latter being used with the Ritchie mineral, or either used separately, as desired, the two substances above named being nearly the same, or identical, as regards their constituent parts. Sand and gravel, either or both, are also used, or combined with the three first-named substances.

To enable those skilled in the art to fully understand and manufacture my improved conglomerate, I will proceed to describe the process of manufacture, and the mode of applying it, or preparing it for use.

The Ritchie mineral and Albertite are first ground or reduced, in any proper way, to a fine powder, and these substances combined, or either of them separately, are mixed with the pine-tar, all being in a cold state while being mixed, and afterward heated to about 300° Fahrenheit, so that the Ritchie mineral, or Albertite, or both, will be dissolved in the tar.

The sand and gravel, either or both, or any equivalent substance which may be used in their stead, such as crushed cinders, are heated separately, and then mixed with the tar-solution. The object in heating the sand, gravel, or their equivalent, is to prevent the latter from cooling the tar-solution when mixed with it. All the substances above named are thoroughly mixed, and the conglomerate is then ready for use.

For paving or street-purposes, it may be spread upon the surface and rolled compactly by heavy rollers, or it may be moulded into bricks or blocks, under pressure, of any desired shape and size.

These bricks or blocks may be transported any distance to the locality where designed for use, and then be melted and spread over the surface properly prepared, or, if designed for paving or street-use, the bricks or blocks may be laid in a solid state, and cemented together by a mixture of pine-tar and Ritchie mineral, or Albertite, either or both of the latter combined, one hundred parts of pine-tar to fifty parts of the Ritchie mineral or Albertite, or fifty parts of the two last-named substances combined.

The proportions of the parts, in making the conglomerate, are, pine-tar, one hundred parts; Ritchie mineral or Albertite, separately or combined, fifty parts; sand, seven hundred parts; gravel, eleven hundred and fifty parts.

Having thus described my invention,

What I claim as new, and desire to secure by Letters Patent, is—

The use of pine-tar, in combination with Ritchie mineral or Albertite, either or both, and sand, gravel, or other equivalent substance, to form a conglomerate for paving, roofing, and analogous purposes, prepared in the manner substantially as herein set forth.

FRANK N. HOPKINS.

Witnesses:
GEO. A. HEMMICK,
BENTLEY S. BIBB.